United States Patent [19]

Ernsberger

[11] 4,406,682
[45] Sep. 27, 1983

[54] METHOD OF OPERATING A FLOAT GLASS FORMING CHAMBER TO REDUCE DRIPPAGE

[75] Inventor: Fred M. Ernsberger, Fox Chapel, Pa.

[73] Assignee: PPG Industries, Inc., Pittsburgh, Pa.

[21] Appl. No.: 298,684

[22] Filed: Sep. 2, 1981

[51] Int. Cl.³ .............................................. C03B 18/18
[52] U.S. Cl. ...................................... 65/99.4; 65/182.3
[58] Field of Search ................. 65/182.3, 99.4, 99.2, 65/65

[56] References Cited

U.S. PATENT DOCUMENTS

| | | | |
|---|---|---|---|
| 710,357 | 9/1902 | Heal | 65/99.2 |
| 789,911 | 5/1905 | Hitchcock | 65/182.4 |
| 3,083,551 | 4/1963 | Pilkington | 65/99.5 |
| 3,127,261 | 3/1964 | Long | 65/90 |
| 3,220,813 | 11/1965 | Nogard et al. | 65/99.4 |
| 3,220,816 | 11/1965 | Pilkington | 65/99.2 |
| 3,305,337 | 2/1967 | Loukes et al. | 65/99.4 |
| 3,317,301 | 5/1967 | Robinson | 65/99.3 |
| 3,330,635 | 7/1967 | Loukes et al. | 65/99.4 |
| 3,330,637 | 7/1967 | Loukes et al. | 65/99.4 |
| 3,337,319 | 8/1967 | Edwards | 65/182.3 |
| 3,337,323 | 8/1967 | Loukes et al. | 65/99.4 |
| 3,343,936 | 9/1967 | Silverwood et al. | 65/99.2 |
| 3,351,447 | 11/1967 | Lawrenson | 65/99.4 |
| 3,356,476 | 12/1967 | Gulotta | 65/99.4 |
| 3,389,983 | 6/1968 | Robinson et al. | 65/99.4 |
| 3,438,761 | 4/1969 | Eloy | 65/99.3 |
| 3,467,512 | 9/1969 | Loukes et al. | 65/99.4 |
| 3,480,420 | 11/1969 | Loukes et al. | 65/99.3 |
| 3,494,754 | 2/1970 | Montgomery | 65/99 |
| 3,494,755 | 2/1970 | Montgomery | 65/99 |
| 3,525,601 | 8/1970 | Ohsato | 65/99.2 |
| 3,597,178 | 8/1971 | Tilton | 65/99 |
| 3,607,179 | 9/1971 | Loukes et al. | 65/99.2 |
| 3,653,869 | 4/1972 | Biagini | 65/99 A |
| 3,843,346 | 10/1974 | Edge et al. | 65/99 A |
| 3,925,052 | 12/1975 | Hummel | 65/99.4 |
| 3,954,432 | 5/1976 | Hummel et al. | 65/99.4 |
| 4,019,885 | 4/1977 | Snow | 65/99.4 |
| 4,115,091 | 9/1978 | Bourggraff | 65/182.3 |
| 4,236,906 | 12/1980 | Hummel | 65/99.4 |
| 4,253,860 | 3/1981 | Hummel | 65/99.2 |

Primary Examiner—Kenneth M. Schor
Attorney, Agent, or Firm—Dennis G. Millman

[57] ABSTRACT

Volatilization of sulfur containing impurities within a float glass forming chamber is suppressed by employing a tin/copper alloy as the molten metal and by removing sulfur impurities from the molten metal by cooling portions thereof to insolubilize the sulfur impurities.

6 Claims, 5 Drawing Figures

METHOD OF OPERATING A FLOAT GLASS FORMING CHAMBER TO REDUCE DRIPPAGE

BACKGROUND OF THE INVENTION

This invention relates to a method for manufacturing flat glass wherein the glass is formed into a flat sheet while supported on the surface of a pool of molten metal, commonly referred to as the float process. More particularly, this invention relates to a process for operating a float forming chamber so as to reduce, or eliminate, the dripping of deposits from the interior roof of the chamber onto the ribbon of glass being formed. Since the dripping of these deposits detrimentally affects the surface flatness of the glass being formed, reducing the drippage improves the quality of the glass produced.

In a float forming process, molten glass is delivered onto a pool of molten metal and is formed into a continuous ribbon or sheet of glass as disclosed, for example, in U.S. Pat. No. 710,357 of Heal; U.S. Pat. No. 789,911 of Hitchcock; U.S. Pat. Nos. 3,083,551 and 3,220,816 of Pilkington; and U.S. Pat. No. 3,843,346 of Edge et al. The temperature of the glass falls as it progresses along the elongated float chamber, typically dropping from a temperature of about 1100° C. to about 600° C. at the exit end where it has cooled sufficiently to be contacted by rollers or other support means to lift the formed ribbon of glass from the molten metal. The molten metal within the float chamber is usually tin, but copper, silver, or gold have occasionally been mentioned as alternative molten metals either alone or as alloys with tin.

The glass in a float forming chamber, particularly at the hot end, has a higher oxygen potential than does the tin with which it is in contact. This results in a number of chemical reactions between the glass and the tin, which result in ionic tin entering the surface of the glass ribbon. Another result is that $SO_3$ normally present in the glass is in part reduced to elemental sulfur which goes into solution in the tin. This sulfur then evaporates from the tin as molecular tin sulfide. This vaporized tin sulfide condenses on cooler portions of the forming chamber and, in time, can build up accumulations on the roof structure of the chamber which then fall as particles or droplets onto the ribbon of glass being formed. These materials adhere and/or embed themselves in the still soft glass ribbon, producing defects in the top surface of the glass which are visible as optical distortion, causing the glass to be downgraded or in some cases rejectable. It is believed that some of the condensed tin sulfide may be reduced to elemental tin in the reducing atmosphere normally maintained within a float glass forming chamber, and thus the particles falling onto the glass ribbon may include molten elemental tin.

Many attempts have been made in the prior art to overcome the problem of condensed materials falling onto the glass ribbon, but none has been entirely satisfactory. U.S. Pat. Nos. 4,253,860 and 4,019,885 disclose periodically cleaning deposited materials from the float chamber roof. U.S. Pat. No. 4,236,906 teaches adding a material to the float chamber atmosphere to induce sublimation of the material. U.S. Pat. No. 3,356,476 discloses cleansing of the float chamber atmosphere to remove condensables therefrom. U.S. Pat. Nos. 3,494,755 and 3,597,178 provide special condensing surfaces within the float chamber in order to collect condensable materials. U.S. Pat. No. 3,494,754 discloses a technique for suppressing volatilization of materials from the molten metal in a float forming chamber by floating a layer of carbonaceous material on the surface of the metal. Purifying the molten metal bath of a float forming chamber so as to remove impurities that could volatilize is taught in U.S. Pat. Nos. 3,317,301; 3,438,761; 3,480,420; and 3,525,601. Including additives in the molten metal bath to suppress formation of impurities is taught in U.S. Pat. Nos. 3,305,337; 3,330,635; 3,330,637; 3,337,323; 3,925,052; and 3,954,432. Despite these many proposals, drippage in float glass forming chambers remains a major cause of defects in the manufacture of float glass.

The use of copper or tin/copper alloys as the molten metal support for forming float glass is disclosed in U.S. Pat. Nos. 710,357; 3,127,261; and 3,351,447.

SUMMARY OF THE INVENTION

It has now been found that volatilization of sulfides in a float glass forming chamber may be reduced by employing as the molten metal an alloy of tin with up to about 30% of copper, and by removing sulfides from the chamber by cooling portions of the alloy to insolubilize the sulfides.

This invention is predicated on two basic discoveries. First, it has been found that sulfur preferentially associates with copper rather than tin when a tin/copper alloy is employed as the molten metal, and since the volatility of copper sulfide is less than that of tin sulfide, the molten metal can accumulate larger amounts of sulfur with less volatilization than with the use of tin alone. Secondly, it has been found that sulfides insolubilize from a tin/copper alloy at higher temperatures than from tin alone. The insolubilized sulfides float to the surface of the molten alloy whereupon they may be skimmed from the forming chamber. Because the sulfides can be insolubilized at relatively high temperatures, the molten alloy can be purified of sulfides with only a slight amount of cooling and with little or no need for reheating the alloy after purification, thus conserving energy. Preferably a small portion of the molten alloy is withdrawn from the downstream portion of the forming chamber into a side chamber where it may be cooled to insolubilize the sulfide and then returned to the forming chamber. Insolubility of the sulfides in the alloy is a matter of degree dependent upon temperature, but it is preferred that the alloy be cooled to a temperature below 500° C. for the most effective separation of the sulfides from the molten alloy. It is also an advantage of the present invention that the sulfide separation is carried out above the melting point of the alloy.

The benefits of the present invention increase with increasing copper concentration. However, since the melting point of the alloy increases with increasing concentration, compatability with the float forming process requires the maximum copper content to be about 30% on an atomic basis.

THE DRAWINGS

DETAILED DESCRIPTION

Figure 1:
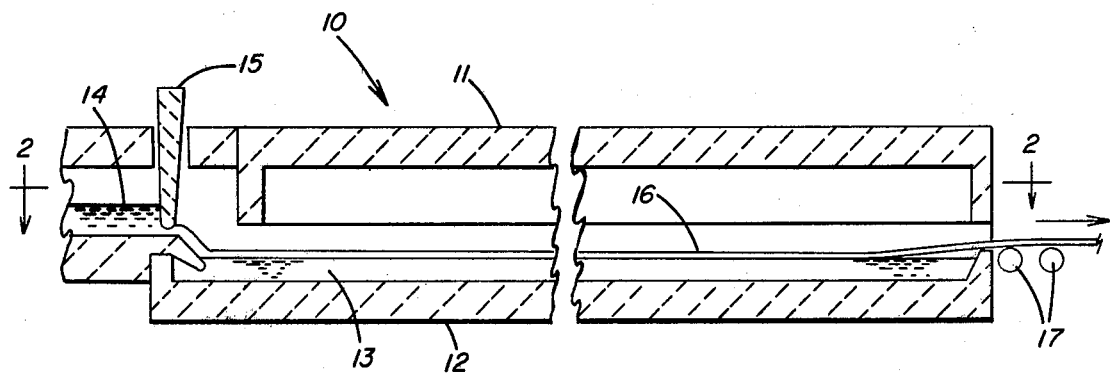
FIG. 1 is a longitudinal cross-section of a schematic representation of a float glass forming chamber of conventional design.
Figure 2:
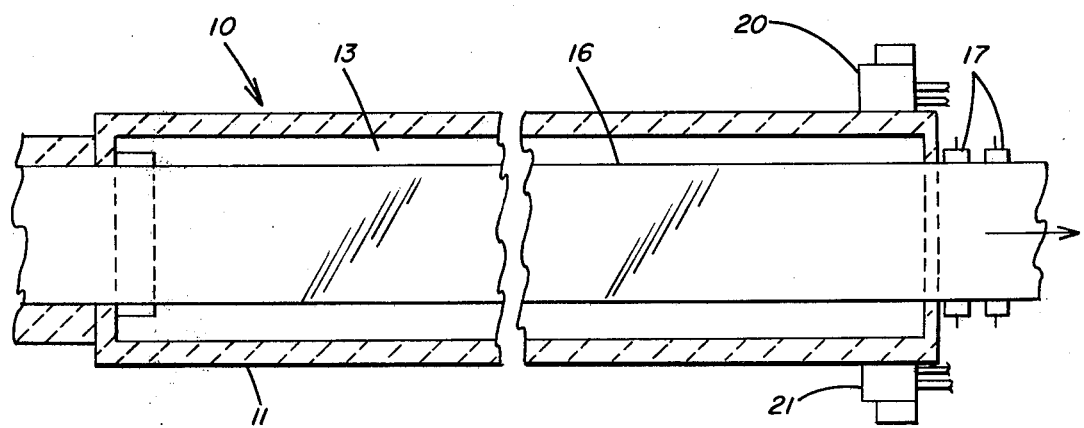
FIG. 2 is a horizontal cross-section through the flat glass forming chamber of FIG. 1, taken along line 2—2 in FIG. 1, showing a pair of side chambers at its exit end for purifying the molten alloy.

The principles of the present invention may be embodied in any design of float glass forming chamber known in the art, an example of which is shown schematically in FIGS. 1 and 2. There, the float glass forming chamber 10 is comprised of an upper housing 11 and a basin 12 containing an elongated pool of molten metal 13 which, in the case of the present invention, is a tin/copper alloy. Molten glass 14 from a melter (not shown) is metered into the forming chamber by a vertically adjustable tweel 15. The molten glass floats on the surface of the molten metal 13 as it is shaped into a ribbon 16 which cools as it progresses along the float chamber until it attains a temperature at which the ribbon is sufficiently stable to be lifted from the molten metal by rolls 17 at the exit end of the forming chamber. The temperature of the molten metal 13 is likewise highest near the location where the molten glass is delivered into the forming chamber and lowest at the exit end of the forming chamber, with temperatures corresponding approximately to the adjacent glass temperatures. With conventional soda-lime-silica flat glass the molten glass is delivered at approximately 1100° C. and is lifted out of the forming chamber at about 600° C.

The melting point of tin alone (232° C.) is sufficiently below the lift-out temperature of the glass to avoid solidification of molten tin at the cold end of the forming chamber. Adding copper to tin raises the melting point of the molten alloy, and therefore, the amount of copper to be included in the alloy is usually limited by the need to maintain the melting point of the alloy below the lift-out temperature for the glass. In most cases, the upper limit on the copper content of the alloy is about 30% (atomic basis), the melting point of that alloy being about 520° C. For a greater margin of safety, a preferred copper content would be about 20%, wherein the alloy melting point would be about 470° C. Minor amounts of other elements may be present in the molten metal as well.

Other float glass arrangements may be conceived wherein the pool of molten metal is divided into separate upstream and downstream pools. In such a case, the upstream pool may be maintained at higher temperatures since it is freed from the thermal constraints of the lift-out end. Therefore, the copper content of such an upstream pool could be higher than 30%.

It has been found that tin sulfide deviates from the behavior of an ideal solute in that its volatilization from molten tin is much greater than would be predicted from its concentration. Therefore, it would be desirable to prevent the association of tin and sulfur by providing an additive with which the sulfur would preferentially associate. It has now been found that this function is performed by copper present in a molten alloy of tin and copper. It has been experimentally determined that under the conditions of the hot end of a float forming chamber the preferential association of sulfur with copper rather than tin becomes more pronounced with increasing copper concentration, the association of sulfur with copper being approximately three times greater than with tin in a 10% copper/90% tin alloy, and approximately 300 times greater with a 30% copper/70% tin alloy. Since the volatility of copper sulfide from solution in molten tin is much less than that of tin sulfide it is advantageous that the sulfur present in a molten tin/copper alloy predominantly associates as copper sulfide.

The tin/copper alloy can retain more sulfur in solution than can a pure tin float glass forming chamber, but eventually the amount of sulfur accumulation in the alloy will reach concentrations that will lead to significant vaporization of sulfur compounds from the alloy. Therefore, treatment of a tin/copper alloy float bath may be delayed longer than a pure tin bath, but eventually it becomes necessary to take measures to remove sulfur from the alloy in order to maintain low levels of sulfide volatilization. The presence of copper in the molten metal has been found to expedite removal of sulfur from the molten metal since sulfur compounds are insolubilized at higher temperatures than with tin alone. The insolubilization of sulfur compounds takes place at temperatures at or slightly below the cold end forming chamber temperatures and therefore, only a small amount of heat need be wasted, if any, in cooling the molten alloy in the sulfur removal process.

The sulfur insolubilizes from the molten alloy as crystalline SnS, the copper sulfide apparently being converted to tin sulfide at the lower temperatures of the cold end. The insolubilized tin sulfide floats to the surface of the alloy and may be removed by mechanical means from the forming chamber. The insolubility of tin sulfide in the alloy is an inverse function of temperature, so that the separation of sulfide is more effective at lower temperatures, but in all cases, the sulfur removal process must be carried out above the freezing point of the alloy. Thus, purifying the alloy of excess sulfur in the present invention entails cooling a portion of the molten metal alloy to a temperature below the cold end temperature of the forming chamber, but above the freezing point of the alloy, to insolubilize tin sulfide. With alloys containing 20% or less copper, the alloy is preferably cooled to a temperature of 500° C. or less. The presence of the insolubilized tin sulfide does not pose a volatilization problem since the vapor pressure of crystalline SnS at the temperatures of the cold end is negligible.

Another advantage of the present invention is that the ability of the alloy to contain relatively high concentrations of sulfur permits the removal of sulfur to be performed efficiently and permits removal of a given amount of sulfur from the alloy by treating a smaller volume of the alloy. This, in turn, implies advantages for the overall forming process in that smaller volumes of the molten alloy need be circulated through the sulfur removal means, thereby producing less thermal and fluid disturbance to the forming process.

Removing the sulfur from the molten alloy may take place in the forming chamber itself, but it is preferred to perform the purification steps in side pockets through which the molten alloy is circulated. Many arrangements for removing impurities from molten tin float baths and for circulating molten tin through side pockets are known in the art, including U.S. Pat. Nos. 3,343,936; 3,389,983; 3,467,512; 3,220,813; and 3,653,869, any of which may be used in conjunction with the present invention. A preferred side pocket arrangement is illustrated in the drawings wherein side pockets 20 and 21 (FIG. 2) flank the cold end of the float forming chamber 10. It should be understood that one, or more than two, side pockets may be employed for the purposes of the present invention. Although it is most efficient to purify the alloy at the location where the alloy is at its lowest temperature in the forming chamber, the side pockets may be adjacent to portions of the forming chamber other than the extreme downstream portion.

Figure 3:
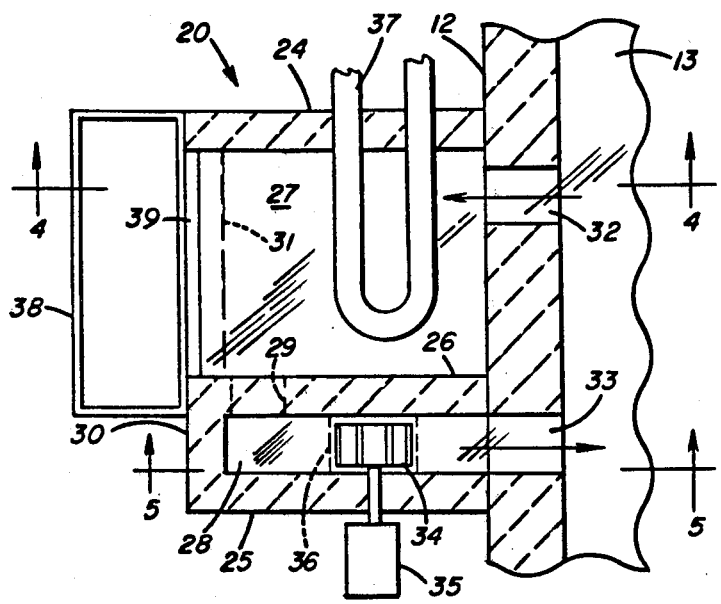
FIG. 3 is an enlarged horizontal section through one of the purification chambers shown in FIG. 2.
Figure 4:
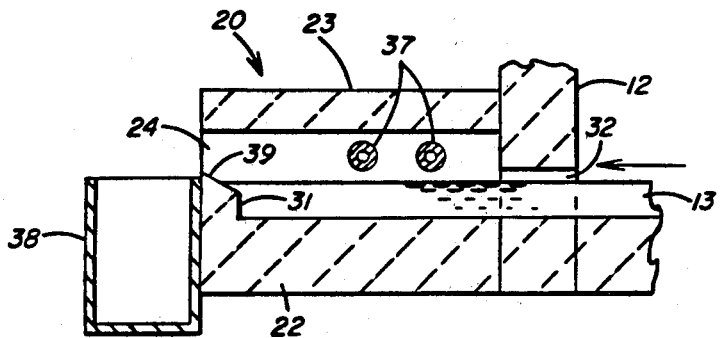
FIG. 4 is a vertical section through the purification chamber of FIG. 3 taken along line 4—4 in FIG. 3.
Figure 5:
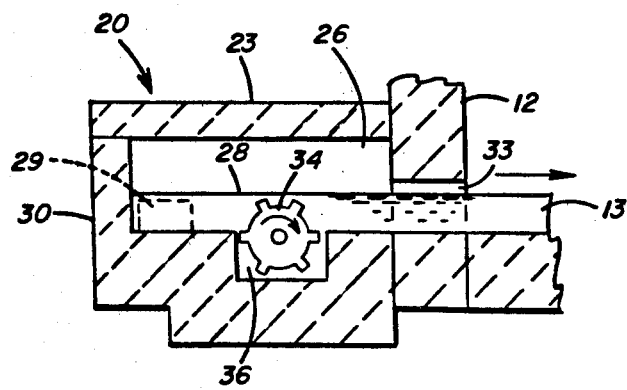
FIG. 5 is a vertical cross-section of the purification chamber of FIG. 3 taken along line 5—5 in FIG. 3.

The construction of side pocket 20 is shown in greater detail in FIGS. 3, 4 and 5. There, it may be seen that the side pocket is formed of refractory bottom 22, top 23 and sidewalls 24 and 25. A refractory dividing wall 26 separates the molten alloy contained within the pocket into separate pools 27 and 28 which are in communication with one another by way of a subsurface opening 29 through the dividing wall 26. The outer end of the pocket portion containing the molten alloy portion 28 is closed by a refractory wall 30. The molten alloy portion 27 in the other side of the pocket is contained by a dam member 31 above which an opening is provided through which the floating sulfide impurities may be raked out of the pocket. The molten metal circulates from the main pool 13 into the portion 27 of the side pocket through an opening 32 in the side wall 12 of the forming chamber and returns to the main pool by way of an opening 33. A preferred means for propelling the molten metal through the pocket is a submerged impeller 34 driven by a motor 35. The lower portion of the impeller is housed in a well 36 so that the upper portion only of the impeller acts to drive the molten metal portion 28 toward the return opening 33 and to draw molten metal from the portion 27 through the submerged opening 29. The molten metal portion 27 is cooled, for example, by a hairpin configuration water cooler 37 as shown in FIGS. 3 and 4. Cooling of the molten metal produces insolubilization of sulfides which float to the surface of the molten metal portion 27 and accumulate in the region of the dam 31. Periodically, the accumulated impurities may be raked over the sloped upper surface 39 of the dam into a collection vessel 38. In some cases, it may be desirable to reheat the molten metal portion 28 being returned to the forming chamber.

It should be understood that a specific embodiment has been described in detail herein in order to disclose the best mode of practicing the invention, but that other variations and modifications as are known to those of skill in the art are included within the scope of the invention as defined by the claims which follow.

I claim:

1. In a float glass method of forming glass into a flat sheet while said glass is supported on a pool of molten metal comprised of tin, wherein sulfur from the glass enters the molten metal, reacts with the tin in the batch, and accumulates to a level at which significant volatilization and subsequent condensation of tin sulfide from the molten metal pool occurs, the improvement comprising:

suppressing volatilization of sulfur compounds by maintaining as the molten metal an alloy of tin with 5 to 30 percent copper on an atomic basis of the entire alloy;

repeatedly drawing a portion of the molten metal alloy having sulfur dissolved therein to a purification chamber;

in the purification chamber, cooling the withdrawn portion to a temperature of 500° C. or less so as to insolubilize sulfur compounds from the withdrawn portion of the molten metal, and separating the insolubilized sulfur compounds from the withdrawn portion of the molten metal; and repeatedly returning the portion of molten metal to the pool, wherein the insoluble sulfur compounds are separated from the withdrawn portions of the molten metal to such a degree as to reduce the sulfur content of the molten metal sufficiently below a saturation level to suppress volatilization of sulfur from the molten metal.

2. The method of claim 1 wherein cooling of the molten metal in the cleansing chamber is carried out by means of heat exchange means extending into the chamber.

3. The method of claim 1 wherein the molten metal alloy includes 5% to 25% copper on an atomic basis.

4. The method of claim 1 wherein the insolubilizing step includes reducing the temperature of the portion of a molten alloy to a temperature above the freezing point of the alloy.

5. The method of claim 4 wherein molten glass is delivered onto the molten metal pool at an entrance end and is withdrawn from the pool at an exit end, and the portion of the molten metal that is cooled is a portion from a zone closely adjacent to the exit end.

6. The method of claim 5 wherein the cooled portion of molten metal is cooled to a temperature below 500° C. but above the freezing point of the alloy so as to insolubilize the sulfur impurities.

* * * * *